June 13, 1972  D. F. CAPELLARO  3,669,542
LIQUID BORNE PARTICLE SENSOR
Filed Oct. 9, 1969  3 Sheets-Sheet 3
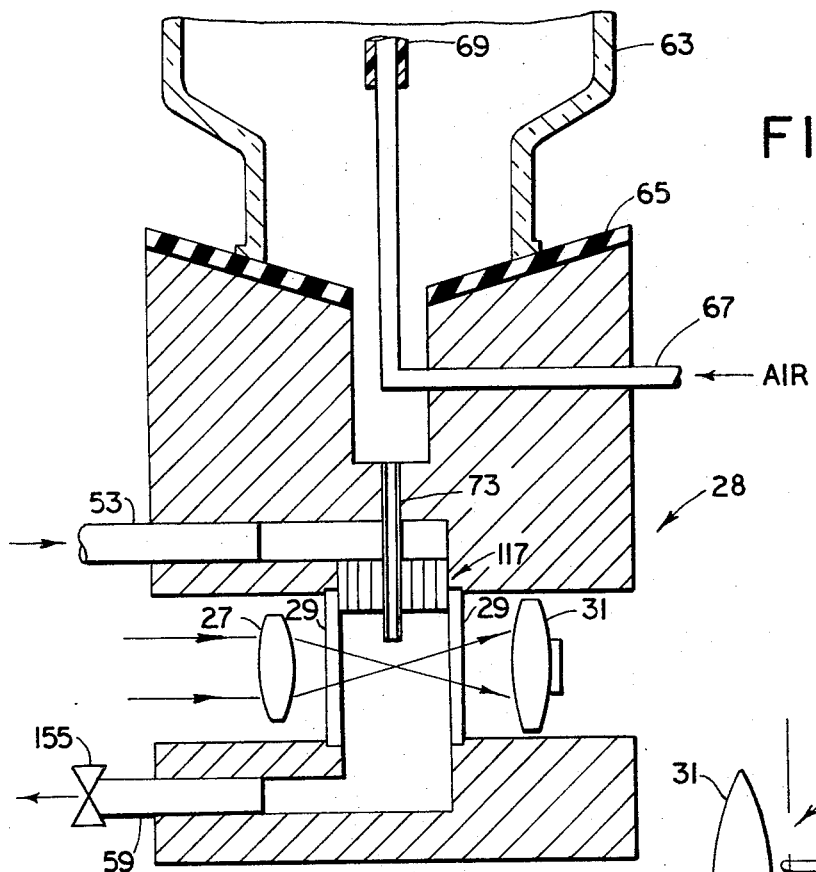
FIG_4
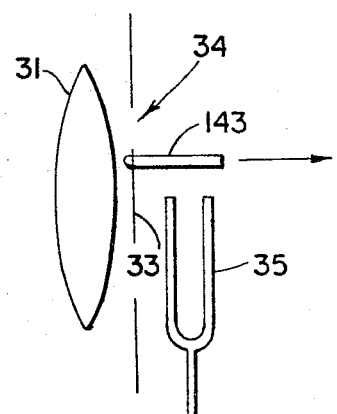
FIG_10
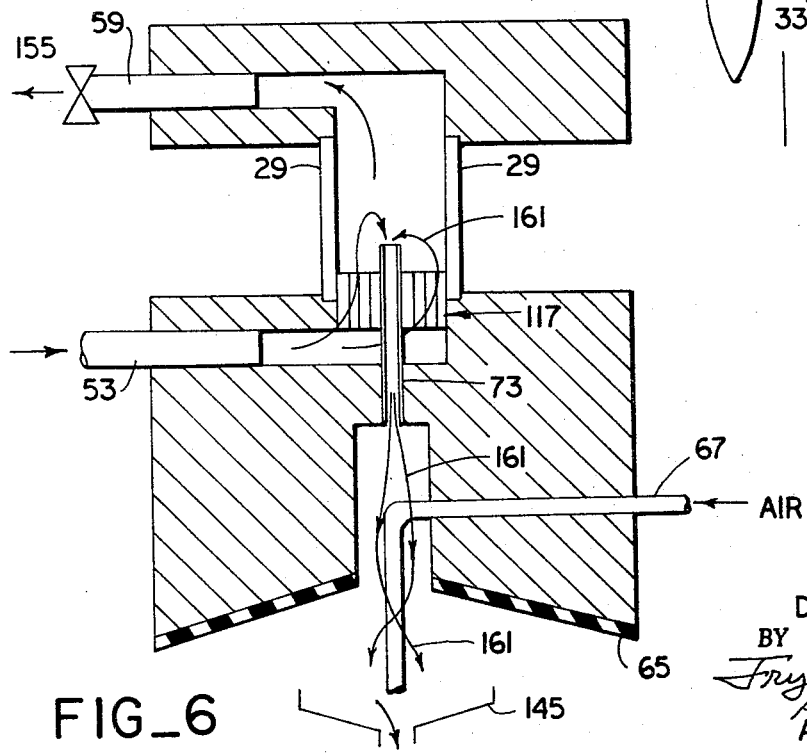
FIG_6
INVENTOR.
DAVID F. CAPELLARO
BY
Fryer, Tjensvold, Feix,
Phillips & Lempio
ATTORNEYS 3,669,542
LIQUID BORNE PARTICLE SENSOR
David F. Capellaro, Palo Alto, Calif., assignor to Coulter
Electronics, Inc., Hialeah, Fla.
Filed Oct. 9, 1969, Ser. No. 865,098
Int. Cl. G01n 1/00, 15/02, 21/06
U.S. Cl. 356—36                                    9 Claims

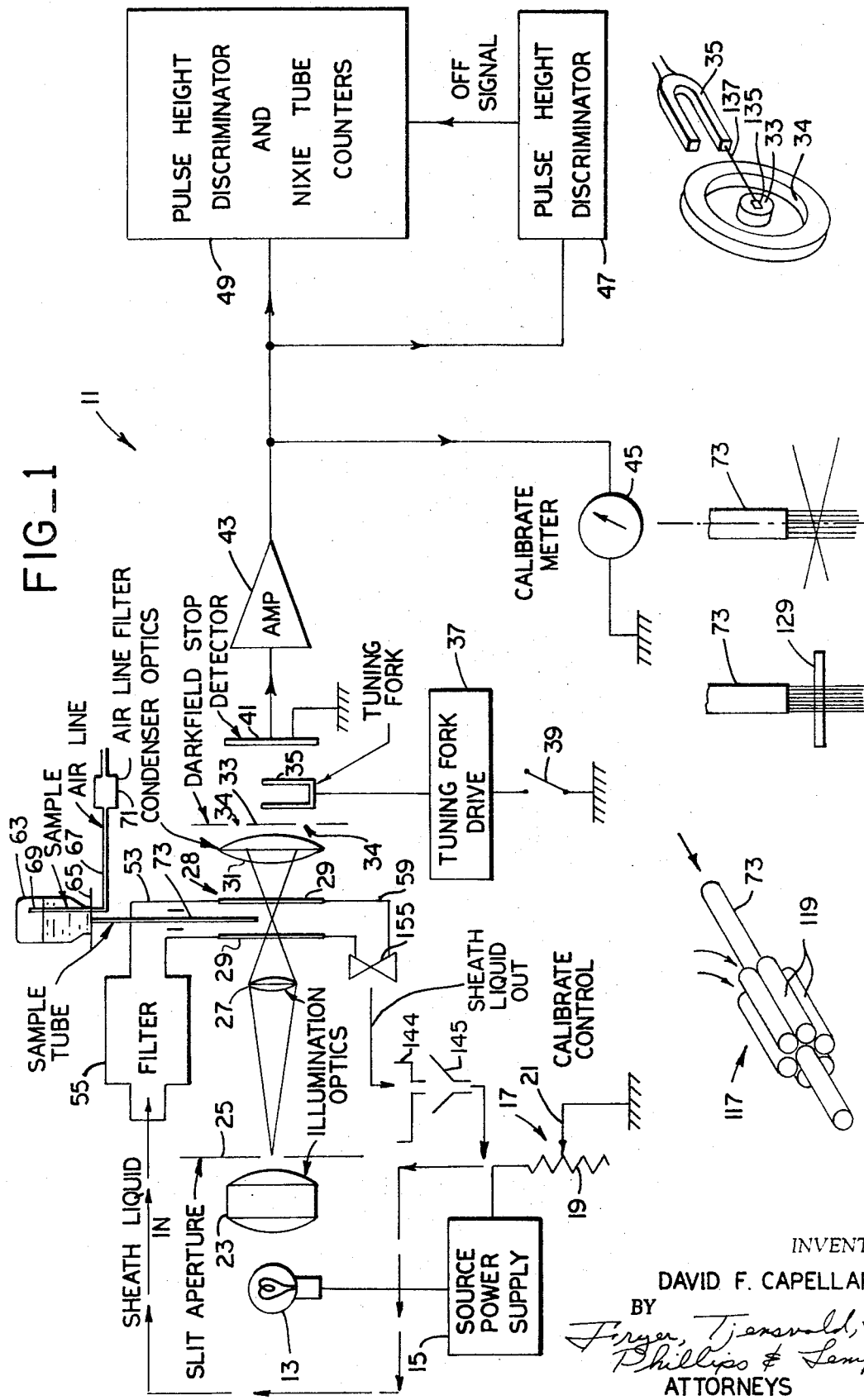

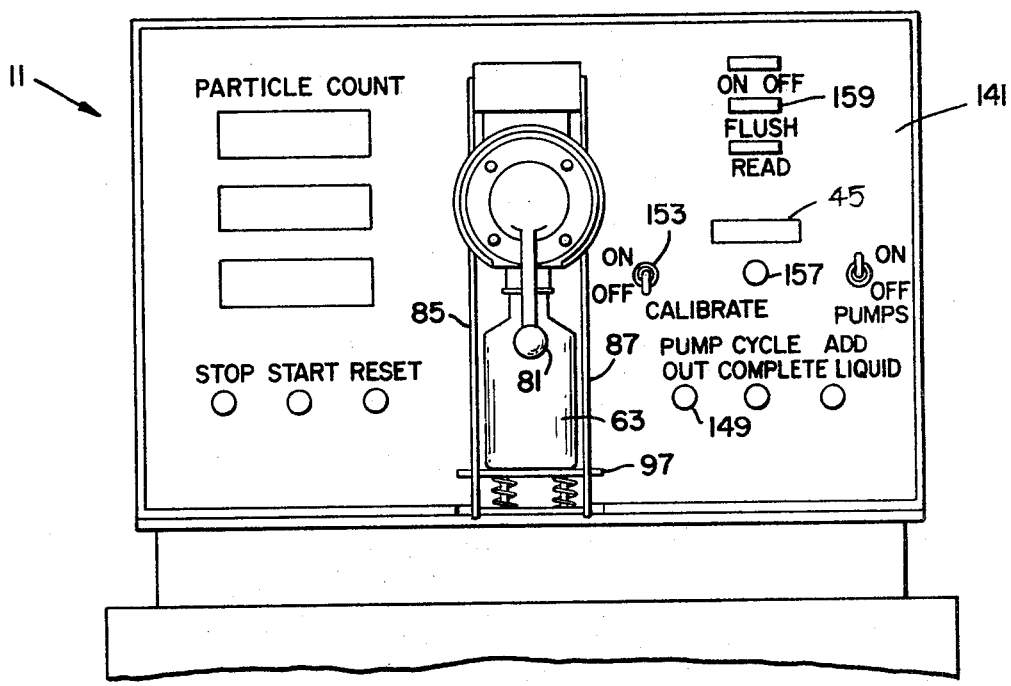
FIG_2
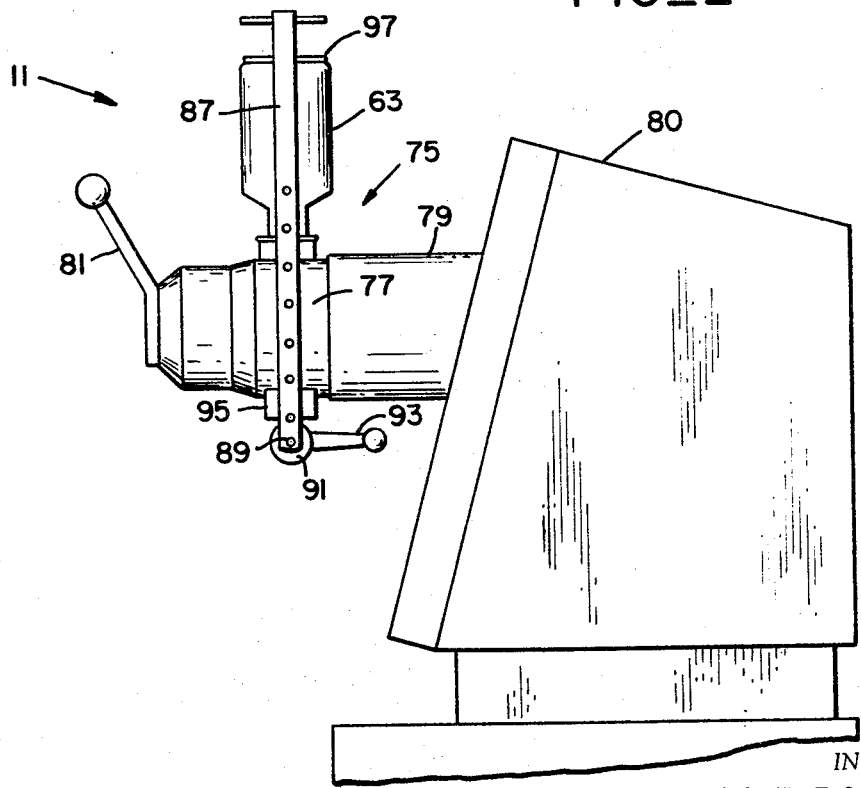
FIG_3

ABSTRACT OF THE DISCLOSURE

An optical particle sensor determines the number of particles suspended in a liquid sample by measuring the scattering of a focused light beam projected through a flowing stream of the liquid sample. The sensor includes a flow cell having a pair of windows. Sheath liquid flows through the flow cell, and the sample liquid is introduced into the center region of the sheath liquid. The liquid sheath shields the particles from the cell walls and accurately positions the particles at the focus of the light beam. The light beam is focused on the liquid sample in the center of the fluid flowing through the flow cell so that any contaminate on the cell windows will have minimum effect. The sensor includes a sample container mounting assembly that rotates the sample container from an upright loading position to an inverted operating position. The sample is introduced into the flow cell by gravity and air pressure feed. A back flush of the sample container with the sheath fluid is provided to assure a complete count and system cleanliness. An automatic cut-off that senses a stream of air bubbles, and a tuning fork calibration system are also provided.

---

The present invention relates to an optical sensor of the kind that operates on the principle of the measurement of the amount of light which is scattered when an intense illuminating beam is projecting through a flow stream containing suspended particles. The present invention relates particularly to a method of and apparatus for accurately containing the sample liquid within the center of a laminar flow of a sheath liquid.

Optical particle sensors of this kind may be used to count small particles in many kinds of fluids. For example, the sensor may be used to count cells in blood samples or particles in hydraulic fluids. Accuracy of counting, cleanliness to avoid contamination of the sample, and quickness and convenience of operation are important factors in the construction and operation of such optical particle sensors.

One of the problems presented by a liquid particle sensor is preventing a false reading from contaminates on the transparent windows through which the light must pass. Scratches, dust or particles from the sample that lodge on such windows will give false signals by scattering the light. It can be quite difficult to clean such windows in prior systems.

It is an important object of the present invention to eliminate false signals due to contaminate on the windows.

Another object of the present invention is to construct a sensor that is easy to clean.

It is another object to construct a sensor that can be operated in a way to assure that all of the particles in the sample fluid have been counted.

The optical particle sensor of the present invention produces a flow stream of liquid through a flow cell having transparent windows. The sample liquid is introduced into the central part of the sheath liquid flow. A light beam is focused at the center of the flow stream in the flow cell and in the region that contains the sample liquid. In this manner the liquid sheath accurately positions the particles in the sample flow at the focus of the light beam and also shields the particles from the cell walls. This allows the optical system to monitor the sample liquid to the exclusion of the cell walls. The optical system produces a sharp image at the center of the flow cell, which is also the location of the sample, while the cell walls form an out of focus image. Anything on the cell walls, such as scratches, dirt or particles, thus contribute in only a minor way to the signal at the detector.

The use of the sheath liquid makes the present invention versatile. Another feature of the present invention is the ability to back flush the sample fluid container with the liquid used for the sheath flow after the sample fluid container has been emptied. The flushing fluid, and any residue sample fluid, flow through the flow cell to assure a complete count of all of the particles in the sample fluid, and the flushing fluid also assures a flushing of the entire system.

Other features of the present invention include an automatic cut-off detector that senses the very large amount of light that is scattered when a stream of air bubbles pass through the light beam focal point in the flow cell. This occurs when the sample fluid has been discharged, and compressed air in the sample container causes the air bubbles then to appear at the focal point.

Another feature of the present invention is the use of a disc that is connected to the arm of a tuning fork wherein the disc opens and closes a light aperture at the frequency of the tuning fork. This is used for calibration to compensate for changes in the intensity of the light source or the light transmitting characteristics of the optical system.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a schematic diagram and side elevation view of a particle sensor constructed in accordance with one embodiment of the present invention;

FIG. 2 is an end elevation view of the particle sensor;

FIG. 3 is a side elevation view of the particle sensor;

FIG. 4 is a cross-sectional view of the flow cell and sample container holding assembly in the operating position;

FIG. 5 is a pictoral view of the sheath tube arrangement for producing laminar flow;

FIG. 6 is a cross-sectional view of the flow cell and sample container holding assembly in the flushing and container loading position;

FIGS. 7 and 8 are schematic views of the sample fluid flow in relation to the light beam focal point;

FIG. 9 is a pictoral view of the tuning fork calibration device of the present invention; and FIG. 10 is a side elevation of the tuning fork calibration device and the air bubble sensing device of the present invention.

An optical liquid borne particle sensor constructed in accordance with one embodiment of the present invention is indicated generally by the reference numeral 11 in FIG. 1.

The sensor 11 includes a light source 13 that is powered by a power supply 15. The voltage output is controlled by a calibrate control 17 having a resistor 19 and a movable arm 21.

The light from light source 13 passes through a collecting lens system 23, a slit aperture 25 and a lens 27. The light passing through lens 27 is focused at about the center of a flow cell 28. The flow cell has transparent windows 29. The light passing through the flow cell 28 also passes through a condensor lens 31.

The unscattered light is blocked by the central part 33 of a dark field stop. The light which is scattered by striking a particle in the flow cell passes through an opening 34 in the dark field stop. This scattered light is detected by a detector 41, which may be a photomultiplier tube.

The output of the detector 41 is applied to the input of an amplifier 43. The output of the amplifier 43 is applied to a calibrate meter 45, a pulse height discriminator 47 and a pulse height discriminator and Nixie tube counters 49.

The calibrating portion of the sensor 11 includes a tuning fork 35, driven by a tuning fork drive 37, and a switch 39.

As noted above, the light that is scattered when the illuminating beam strikes a suspended particle (conducted into the sensor 11 through the flow cell 28) is transmitted to the detector. The intensity of this scattered light is measured by the counter 49. The intensity of the scattered light indicates the particle size, and the number of particles is summed by the Nixie tube counters of the counter 49.

An inlet conduit 53 is connected to the inlet of the flow cell 28.

The inlet conduit 53 includes a filter 55, and a pump (not shown) pumps a flow of sheath liquid through the conduit 53.

The outlet of the flow cell 28 is connected to an outlet conduit 59.

The sample fluid containing the particles to be counted is contained in a bottle or sample container 63. The container 63, as shown in detail in FIG. 4 and as will be described in greater detail below, has an open end pressed into sealing engagement with a conically shaped resilient seat 65.

With continued reference to FIG. 1, air is conducted to the space above the liquid sample by an air line 67. An air line extension 69 is preferably used so that different lengths of extension line can be used for different sizes of containers. The end of the air line should be near the end of the container to minimize bubbling of the air in the sample liquid. The air is filtered by an air filter 71 immediately before it passes into the container 63 to prevent contamination of the sample.

The structure of the sensor immediately below the sample container 63 includes an outlet tube 73 that extends into the flow cell 28 (see FIG. 4). The tube introduces the liquid sample to the center of the liquid flowing through the flow cell so that the liquid being pumped through the conduit 53 acts as a sheath about the sample liquid flow.

As will be described in greater detail below, the liquid discharged through outlet conduit 59 may contain only sheath liquid during certain operations or may contain sheath liquid and the sample liquid during the sampling operations. The liquid flowing through the outlet conduit 59 may be discharged as waste material or it may preferably be recirculated by collecting it in a reservoir, not shown, and pumping it to the inlet of the filter 55 directly or by way of one or more prior filters. The filter 55 removes sample particles or other contaminates and discharges a clean uncontaminated sheath liquid. The location of the filter 55 as the last element before the flow cell is important. This location of the filter downstream of the pumps and valves insures that any particulate matter from such pumps or valves is filtered out of the liquid.

During the sampling operation the sheath liquid flow contains the sample flow in an accurately positioned flow stream. This is because the sheath fluid flowing between the cell walls 29 has nearly laminar flow, and the sample fluid is discharged in the same flow direction and in about the center of the sheath fluid. The laminarizing means for insuring isokinetic or near isokinetic flow conditions in the flow cell are indicated generally by the numeral 117 in FIG. 4.

As best illustrated in FIG. 5 the laminarizing means 117 include a plurality of tubes 119 that surround the sample tube 73.

The liquid sheath also isolates the sample from the cell walls. This allows the optical system to monitor the sample to the exclusion of the cell walls. The optical system produces a sharp image at the center of flow cell 28, which is also the location of the sample, so that the cell walls form an out of focus image. Therefore, anything on the cell walls themselves, such as scratches, dirt or particles contribute in only a minor way to the signal at the detector.

The sheath liquid can be any liquid having a refractive index that is the same as the sample liquid. However, it is generally desirable that the sheath liquid be the same as the sample liquid.

The container 63, holding the sample, is initially attached to the sensor in the upright position of the contained as illustrated in FIG. 2. However, during the sampling phase of operation, the sample contained 63 is inverted as illustrated in FIGS. 1, 3 and 4. Presenting the sample contained to the sensor in this manner has the advantage of simplifying sampling. It is only necessary to open the sample bottle and to attach it directly to the sensor. There is a minimum of disturbance and the sample is taken directly from the bottle.

The inversion of the sample container 63 is accomplished by a container rotating assembly 75 as illustrated in FIGS. 2 and 3. The assembly 75 includes a member 77 mounted for rotation on a support member 79. The support member 79 is rigidly supported by a housing 80. A handle 81 is attached to the rotating member 77 for rotating the member 77 and the sample container 63 to either the sample loading position as shown in FIG. 2 or the sample running position as shown in FIG. 3.

A clamp assembly holds the sample container 63. The clamp assembly includes a pair of parallel rods 85 and 87 which are adjustable to accommodate different sizes of sample containers. The clamp is adjusted by selecting a particular pair of opposite openings 89 and inserting a pin through the openings. A cam 91, actuated by a handle 93, acts on a cam plate 95 to clamp the sample container in place. The clamp assembly also includes a spring biased support plate 97 between the parallel rods 85 and 87.

As shown in FIG. 4, the seat 65 for the sample container is made of flexible material to accommodate any misalignment and to provide an effective seal against the open end of the sample container 63. The seat 65 is preferably conical in shape so that all of the sample in container 63 will flow downwards and be counted.

In one specific form of the present invention the flow cell 28 has been constructed from 416 Stainless Steel with quartz windows forming the windows 29. The windows 29 are preferably removable so that different windows may be used. Windows of Pyrex, optical glasses or sapphire may be used for special purposes. It has been found that quartz, having the lowest Refractive Index of all commonly available chemically resistant glasses, generates relatively little background noise.

The lens 27 and 31 are mounted to rotate with the rotating assembly.

FIG. 7 shows an enlarged view of the slit image 129 in relation to the sample flow and the sheath liquid. The rectangular shaped image is wider than the width of the sample flow to insure that all of the particles are counted.

FIG. 8 shows an enlarged view of the light beam focus providing the slit image 129. The narrow angle of the beam is important because the beam is essentially a parallel beam for purposes of illuminating the particles. Thus, if a particle is in the front of the beam or in the center of the beam, the pulse height generated by the detector 41 would be relatively independent of the location of the particles and the beam.

Calibration is essentially an operation which maintains the overall photometric efficiency of the optical train within the sensor at a preset level by varying the light intensity of the light source 13 over a small range. This permits an adjustment to be made which will allow for the effects of lamp aging, the presence of dirt or dust on the various lenses and windows within the sensor instrument, and minor misalignment which may occur during cleaning and reassembly of the flow cell 28.

Calibration is achieved by attaching a small disc 135 (see FIG. 9) to one tine of the tuning fork 35 by small rod 137. The disc 135 normally covers a small aperture, not shown, in the dark field stop 33. When the tuning fork is activated by the switch 39 (FIG. 1) for calibration purposes, the disc 135 covers and uncovers the aperture in the dark field stop 33 at the natural frequency of the tuning fork.

This calibration signal of known frequency is monitored for light intensity by the meter 45 (see FIG. 2) located on the front panel 141 of the instrument. The intensity of light source 13 is adjusted (by a knob 157 shown in FIG. 2) to provide the desired reading on the meter 45.

FIG. 10 shows a cut-off sensing device 143. The device 143 may be a light sensitive diode that senses light scattered when the sample flow has terminated and there is a flow of air through the instrument. The characteristics of the air flow are sufficiently different from the sample flow to be able to detect the end of the sample flow when air starts to flow through the instrument. This is because an air bubble scatters a much greater amount of light than a particle in the sample fluid, and the scattered light from the bubble provides a sufficient output from the diode 143 to the discriminator 47 to cause the discriminator and counter 49 to automatically cut-off the sampling operation. This same cut-off operation may be done manually by an observation of the sample flow.

The sensor 11 preferably includes a reservoir 144. The reservoir may be connected to a drain 145 (see FIGS. 1 and 6). A relatively small reservoir may be used to maintain ease of filtration with any excess liquid passing to an additional larger reservoir, the contents of which do not contribute to the sheath flow. If a reservoir is employed, then a sensing device can also be employed to prevent inadvertent flooding. The sensing device can be connected to turn on a pump out light 149 on the front panel 141 when the reservoir is full.

OPERATION

Preliminary operation is as follows:

The reservoir is filled with sufficient sheath fluid, typically one quart, to assure one cycle of operation. This liquid is normally that which forms the major constituent of the sample being measured. For measurement of IV solutions in the pharmaceutical fluid, the sheath fluid may be saline or glucose and for measurement of contaminate in the aircraft maintenance field, the sheath fluid may be gasoline or hydraulic pump oils. The sheath fluid in the reservoir need not be perfectly clean since the filters will provide the necessary cleaning.

Next, a short piece of tubing 69 (FIG. 4) of the appropriate length is slipped over the tube 67 so that the end of the tubing is extended to about ⅛ inch from the bottom of sample container 63.

The sensor is now turned on by a start switch 153 (FIG. 2) and allowed to warm up for a few minutes. The sensor is then calibrated by pressing the calibrate switch 39 which actuates the tuning fork calibration system. The knob 157 (FIG. 2) is rotated (which moves the arm 21 of the calibrate control 17) until the meter 45 is at the correct position.

The next step of operation is to flush the system. This is done by closing a valve 155 (FIGS. 1 and 6) by actuation of the flush button 159 (FIG. 2). The resulting back flow of sheath fluid is illustrated by the arrows 161 of FIG. 6. In this operation the sheath fluid washes the surfaces of the tube 73 and the air line 67 and passes through the drain 145 and into the reservoir.

This flushing operation is an important self-cleaning technique.

After cleaning the flush button is released and the sample bottle is placed in position as shown in FIG. 2.

As a result of the flushing prior to attaching the sample, any particulate matter or remnants of a previous sample are flushed out of the flow cell and off of the pressurizing tube and out of the system.

After the sample bottle is clamped in place the entire flow cell and sample assembly is rotated to the position illustrated in FIGS. 1, 3 and 4.

The actual measurement is now made by initiating an automatic cycling sequence. The entire contents of the sample bottle are run through the flow cell as described above.

After the sample has passed through the machine additional flushing (and monitoring of the flushing liquid) may be performed by pressing the flush button 159 (with the container in the position shown in FIG. 2) and observing the flow into the container. When the sample container is filled with flushing liquid, agitation may be accomplished by rotating the sample holder assembly several times and then returning to the inverted position. Another count can then be taken. This may be repeated until no further cumulative count is recorded.

On returning the sample container to the FIG. 2 position and removing the sample bottle, the cycle may be repeated immediately for other samples.

Another mode of operation is to put the sample to be counted in a sample bottle having a substantially larger volume than the sample and then to back flush sheath liquid into the sample bottle to dilute the sample. Then the sample counting process is performed as previously described. This method may be useful, for example, where the concentration of the sample is too great, as may be the case of relatively opaque motor oils.

Back flushing thus permits cleaning of the sensor, dilution of the sample and flushing of the sample container repeatedly to insure any desired degree of cleanliness for particle counts.

A liquid may be used instead of air to force the sample from the sample bottle in certain situations.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. An optical particle sensor of the type for determining the particle size and number concentration of particles in a liquid sample by measuring the scattering of a focused light beam projected through a liquid flow stream in which the particles of the sample are suspended, said sensor comprising, a flow cell, conduit means connected to the flow cell for conducting a liquid flow through said flow cell, means for focusing a beam of light on a portion of the liquid flow in the flow cell, window means in the flow cell for transmitting the light beam into and through the flow cell, sheath liquid flow means for producing a flow of sheath liquid through the conduit means and flow cell, sample flow means for introducing the liquid sample into the sheath liquid flow in the center of the sheath liquid flow so that the particles to be counted are both shielded from the walls and window means of the conduit means and flow cell and are also accurately positioned at the focus of the light beam by the sheath liquid flow, means including a photosensor for measuring the light scattered by the suspended particles and means for producing a signal related to the measured scattered light and indicative of the number of particles in the sample, and substantially self-contained and closed loop means for recirculating sheath fluid to said sheath liquid flow means, said sheath fluid recirculating means including filter means for filtering the fluid flow after it leaves the flow cell whereby filtered fluid is recirculated into the cell as sheath fluid.

2. An optical particle sensor as claimed in claim 1 wherein said sheath fluid recirculating means includes a reservoir for collecting the fluid flow after it leaves said flow cell.

3. An optical particle sensor as claimed in claim 1 wherein said sample flow means include attachment means for attaching a sample container to said sensor in fluid tight relationship, said attachment means including a resilient seat exterior of the flow cell for accommodating imperfections in the end surface of the container.

4. An optical particle sensor as claimed in claim 1 including laminarizing means for producing smooth, non-turbulent flow of the sheath fluid through said flow cell, said laminarizing means including a plurality of annularly disposed tubes extending in the direction of fluid flow and said sample flow means including a tube extending through the center of said laminarizing means so that isokinetic or near isokinetic flow is produced through said flow cell.

5. An optical particle sensor as claimed in claim 1 including calibration means, said calibration means including a dark field stop having a small central aperture in the optical path of the light beam, a tuning fork and a flag mounted on one tine of said tuning fork and movable out of and into a normal light blocking position with respect to said aperture when said tuning fork is activated on demand.

6. An optical particle sensor of the type for determining the particle size and number concentration of particles in a liquid sample by measuring the scattering of a focused light beam projected through a liquid flow stream in which the particles of the sample are suspended, said sensor comprising, a flow cell, conduit means connected to the flow cell for conducting a liquid flow through said flow cell, means for focusing a beam of light on a portion of the liquid flow in the flow cell, window means in the flow cell for transmitting the light beam into and through the flow cell, sheath liquid flow means for producing a flow of sheath liquid through the conduit means and flow cell, sample flow means for introducing the liquid sample into the sheath liquid flow in the center of the sheath liquid flow so that the particles to be counted are both shielded from the walls and window means of the conduit means and flow cell and are also accurately positioned at the focus of the light beam by the sheath liquid flow, means including a photosensor for measuring the light scattered by the suspended particles and means for producing a signal related to the measured scattered light and indicative of the number of particles in the sample, and said sample flow means including attachment means for attaching a sample container to said sensor in fluid tight relationship, said attachment means being rotatable from a loading position in which the sample container is presented to said sensor with an open end of the container up, to an operating position in which the sample container is turned upside down.

7. An optical particle sensor as claimed in claim 6 including a conduit which extends into the interior of the container for injecting fluid into the container to assist in ejecting the sample liquid from the container.

8. An optical particle sensor of the type for determining the particle size and number concentration of particles in a liquid sample by measuring the scattering of a focused light beam projected through a liquid flow stream in which the particles of the sample are suspended, said sensor comprising, a flow cell, conduit means connected to the flow cell for conducting a liquid flow through said flow cell, means for focusing a beam of light on a portion of the liquid flow in the flow cell, window means in the flow cell for transmitting the light beam into and through the flow cell, sheath liquid flow means for producing a flow of sheath liquid through the conduit means and flow cell, sample flow means for introducing the liquid sample into the sheath liquid flow in the center of the sheath liquid flow so that the particles to be counted are both shielded from the walls and window means of the conduit means and flow cell and are also accurately positioned at the focus of the light beam by the sheath liquid flow, means including a photosensor for measuring the light scattered by the suspended particles and means for producing a signal related to the measured scattered light and indicative of the number of particles in the sample, and said sample flow means including attachment means for attaching a sample container to said sensor in fluid tight relationship, said conduit means including outlet conduit means connected to the outlet end of said flow cell and valve means in said outlet conduit means downstream of said sheath flow means, said valve means being operable to close said outlet conduit means whereby sheath fluid is caused to flow into the container for diluting the liquid sample in the container and for the purpose of back-flushing all of the sample from the container to be sure the entire sample passes through the flow cell and is counted.

9. An optical particle sensor of the type for determining the particle size and number concentration of particles in a liquid sample by measuring the scattering of a focused light beam projected through a liquid flow stream in which the particles of the sample are suspended, said sensor comprising, a flow cell, conduit means connected to the flow cell for conducting a liquid flow through said flow cell, means for focusing a beam of light on a portion of the liquid flow in the flow cell, window means in the flow cell for transmitting the light beam into and through the flow cell, sheath liquid flow means for producing a flow of sheath liquid through the conduit means and flow cell, sample flow means for introducing the liquid sample into the sheath liquid flow in the center of the sheath liquid flow so that the particles to be counted are both shielded from the walls and window means of the conduit means and flow cell and are also accurately positioned at the focus of the light beam by the sheath liquid flow, means including a photosensor for measuring the light scattered by the suspended particles and means for producing a signal related to the measured scattered light and indicative of the number of particles in the sample, means for injecting an air flow into said container, means for detecting a stream of air bubbles derived from said air flow and flowing through said flow cell after all of the liquid sample has been taken from the container, and shut-off means operated in response to a signal produced by said detector means when said stream of air bubbles begins to pass through said flow cell and effective to stop further fluid flow through said flow cell.

(References on following page)

References Cited

UNITED STATES PATENTS

| | | | |
|---|---|---|---|
| 2,731,877 | 1/1956 | Clamann | 250—218 X |
| 2,732,753 | 1/1956 | O'Konski | 356—103 X |
| 3,504,183 | 3/1970 | Salkowski et al. | 356—103 X |
| 3,361,030 | 1/1968 | Goldberg | 250—218 X |
| 3,263,554 | 8/1966 | Pickels | 356—246 |
| 2,484,418 | 10/1949 | Mercier | 138—44 |
| 3,523,733 | 8/1970 | Kling et al. | 250—218 X |
| 2,967,450 | 1/1961 | Shields et al. | 356—102 X |
| 3,480,369 | 11/1969 | Smythe et al. | 250—218 X |
| 2,920,525 | 1/1960 | Appel et al. | 356—103 X |
| 3,045,123 | 7/1962 | Frommer | 356—103 X |
| 1,631,021 | 5/1927 | Dowling | 250—218 X |
| 3,463,142 | 8/1969 | Harte | 356—39 X |
| 175,609 | 4/1876 | Holl | 222—400.7 |
| 3,236,602 | 2/1966 | Isreeli | 250—218 X |
| 3,283,645 | 11/1966 | Wada | 250—218 X |

RONALD L. WIBERT, Primary Examiner

W. A. SKLAR, Assistant Examiner

U.S. Cl. X.R.

138—44; 222—400.7; 250—218, 222 (PC); 356—102, 104, 208